April 12, 1955  E. W. OLSON ET AL  2,705,915
BALE DENSITY CONTROLLER

Filed May 28, 1952  3 Sheets-Sheet 2

Inventors
Elmer W. Olson
Robert E. Lee
by Kenneth Nickels
Attorney

April 12, 1955 E. W. OLSON ET AL 2,705,915
BALE DENSITY CONTROLLER
Filed May 28, 1952 3 Sheets-Sheet 3

Inventors
Elmer W. Olson
Robert E. Lee
Kenneth Duckwitz
by
Attorney

United States Patent Office 2,705,915
Patented Apr. 12, 1955

2,705,915
BALE DENSITY CONTROLLER

Elmer W. Olson and Robert E. Lee, North Branch, Minn.

Application May 28, 1952, Serial No. 290,394

15 Claims. (Cl. 100—88)

This invention relates to a baling machine of the type designed to pick up material lying on the ground, to convey the material into an apparatus operative, to roll the incoming material into a formed cylindrical bale, to wrap binding material around the bale while it is in the machine, and to discharge the wrapped bale from the machine. And more particularly, the present invention is directed toward and contemplates incorporating features of improvement advantageously affecting the rolling of the material into a formed cylindrical bale.

In this connection, the heretofore known machines of this type embody a material rolling mechanism which rolls the material under a predetermined tension and this tension remains substantially constant during the entire bale forming process. When utilizing any of these heretofore known machines, it sometimes happens when a windrow being picked up is too thin or too moist that a bale is formed having an excessively tight wound center portion.

Accordingly, it is an object of this invention to provide means for rolling the core of a bale under a predetermined tension and rolling the remainder of the bale under a different tension.

It is believed that if the bale has a soft core (that is of low density) it will dry out readily and this is of particular importance if the material has been baled while on the damp side, thus eliminating spoilage through mustiness and mold.

Another object of this invention is to provide means in a baler for rolling up material into a cylindrical bale wherein the material forming the core thereof will be less dense than the outer layers.

Another object of this invention is to provide a bale density controller in a baler for rolling up material into a cylindrical bale wherein the material forming the core thereof is less dense than the outer layers and the outer layers gradually become more dense from the core outward so that the material forming the outer layer of the bale is the most dense of all.

With the outer layers being more dense than the inner layers, it is believed that such bale will shed rain more readily without absorbing an objectionable amount of moisture.

The significance of the previously stated objects and the manner in which they may be readily accomplished in whole or in part will become apparent as the disclosure progresses and particularly points out additional objects, advantages and features which are considered of special importance and of general application although shown and described as applied to the type of machine disclosed in C. J. Scranton et al., U. S. 2,468,641 and P. H. Harrer U. S. 2,424,821 issued April 26, 1949 and July 29, 1947, respectively.

Accordingly, the invention may be considered as consisting of the various details of construction, correlation of elements and arrangements of parts as is more fully set forth in the appended claims and the detailed description, reference being had to the accompanying drawings, in which:

Figure 1:
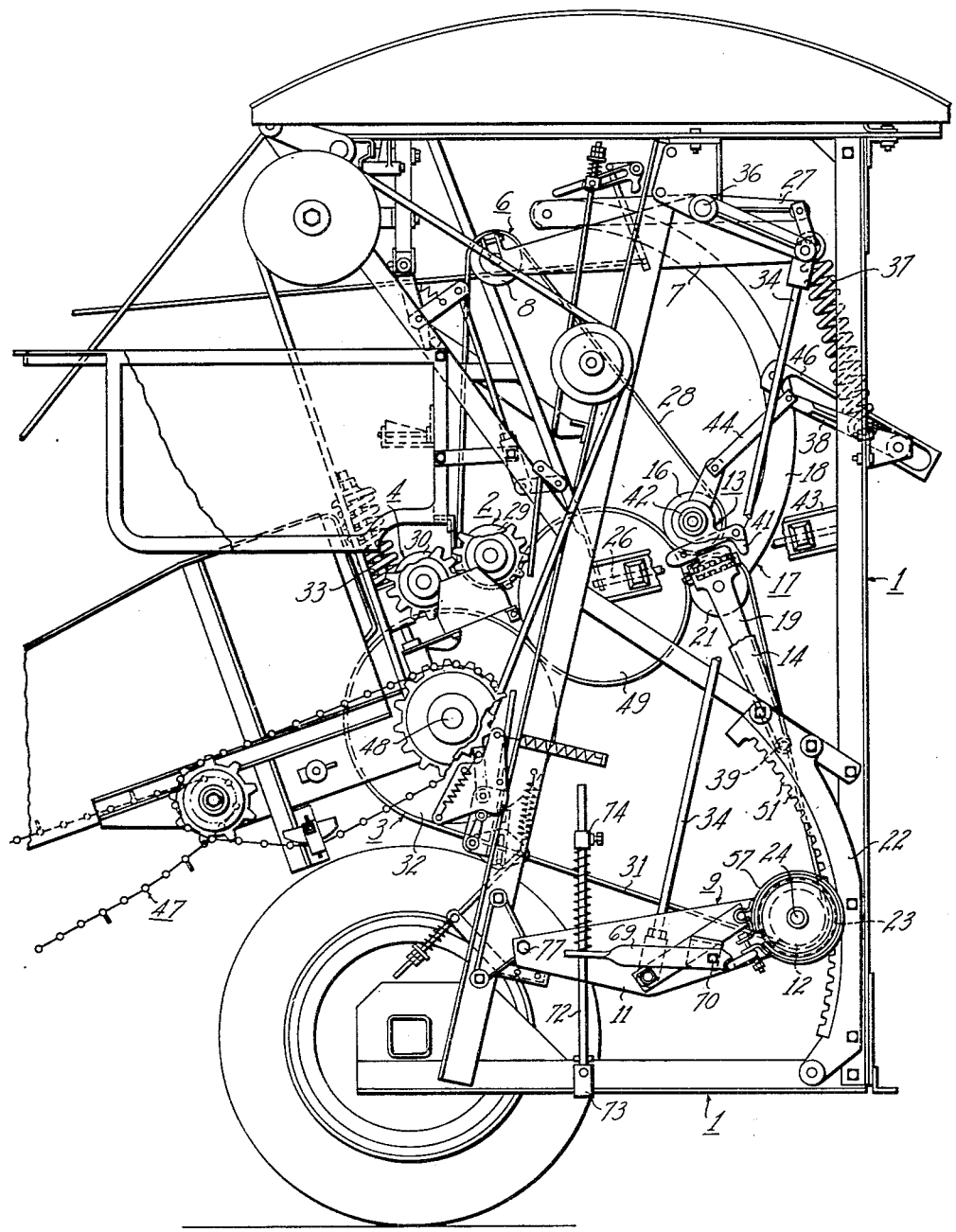
Fig. 1 is a side view of a baling machine embodying the invention with parts broken away to better show details of construction and wherein the machine has partially rolled a bale.

Referring to Fig. 1, it is seen that the invention may be applied to a wheel supported baling machine including a frame structure 1 operatively mounting an upper drive roll assembly 2, a lower drive roll assembly 3, a press roll assembly 4, an upper tension roll assembly 6 including pivotally supported tension arms 7 (only one of which is shown) rotatably mounting a roll 8, a lower tension roll assembly 9 including pivotally supported tension arms 11 (only one of which is shown) rotatably mounting a roll 12, an upper trip roll assembly 13 including an arm 14 rotatably supporting a roll 16, a lower trip roll assembly 17 including a hanger or bow member 18 supported at its lower end on arm 19 which in turn rotatably mounts a roll 21, arcuate racks 22 with which are engaged pinions 23 carried by the adjacent end of lower tension or torque transmitting shaft 24, a pivoted latch release bar 26 and a discharge rocker arm 27.

One or more endless bale forming bands or belts 28 are mounted for movement over the roll portion 29 of drive assembly 2, over the roll 8 of the upper tension assembly 6, and over the roll 16 of the upper trip assembly 13. Also one or more endless bale forming bands or belts 31 are mounted for movement over the roll portion 32 of drive assembly 3, over the roll 12 of the lower tension assembly 9, and over the roll 21 of the lower trip assembly 17; the belts being driven in opposite directions by the roll portions 29 and 32 of the drive assemblies 2 and 3, respectively. Press roll assembly 4 is preferably gear driven by the upper drive roll assembly 2 as shown in Fig. 1 and the roll portion 30 of assembly 4 is preferably releasably held in engagement with roll portion 32 of lower drive assembly 3 by means of one or more springs 33.

The upper and lower tension arms 7 and 11 are pivotally interconnected for simultaneously angular movement by means of a rod 34 and the upper tension arm 7 and discharge rocker arm 27 are mounted for relative angular movement about a common fulcrum 36, arm 7 being biased by a spring (not shown) for clockwise movement about said fulcrum, and arm 27 being biased against movement in a counterclockwise direction by means of a spring 37 having one end connected with one arm of a bell crank lever 38 and having its other end connected with the adjacent end of arm 27. Trip roll arms 14 and 19 are pivotally interconnected at 39 for relative angular movement and are normally retained locked in the aligned position shown in Fig. 1 by means of a releasable latch 41 carried by arm 14 in a position to engage the top portion of arm 19. Arm 14 also has mounted thereon a flange wheel 42 adapted to engage and roll along the top surface of an inclined frame member 43 which mounts the latch bar 26; this arm and wheel being normally supported for coaction with the top surface of member 43 by means of a link 44 connecting the upper end of arm 14 with an arm of bell crank lever 38. Movement of bow member 18 toward the lower drive roll assembly 3 is limited by a loop link 46 connected as shown. Material to be baled is delivered to a point adjacent roll portions 30 and 32 of press roll assembly 4 and lower drive roll assembly 3, respectively, by means of an endless conveyer 47 which is chain driven by shaft 48 forming a part of the lower drive roll assembly.

The various parts thus far described are constructed and correlated to operate in substantially the same manner as the corresponding parts of the previously identified Scranton and Harrer patents; it being sufficient in this connection to point out that the material passing the roll portions of press roll assembly 4 and lower drive roll assembly 3 is engaged by the endless bale forming bands 28 and 31 and rolled into a compact cylindrical bale 49. And that when the bale attains a desired diameter the conveyor 47 is stopped, the latch release bar 26 is actuated to lift latch 41 on arm 14 whereupon the upper and lower trip roll assemblies 13 and 17, respectively, move apart ejecting the bale rearward from between the bale forming bands 28 and 31 and out of the machine; the trip and tension assemblies automatically returning to their initial bale starting position with the arms 14 and 19 relatched in the aligned relation shown. Mechanism is provided for controlling the tension the bands produces. In the prior art machines, uniform force was applied through the two tension arms to the bale forming bands to produce a bale of uniform density.

Figure 2:
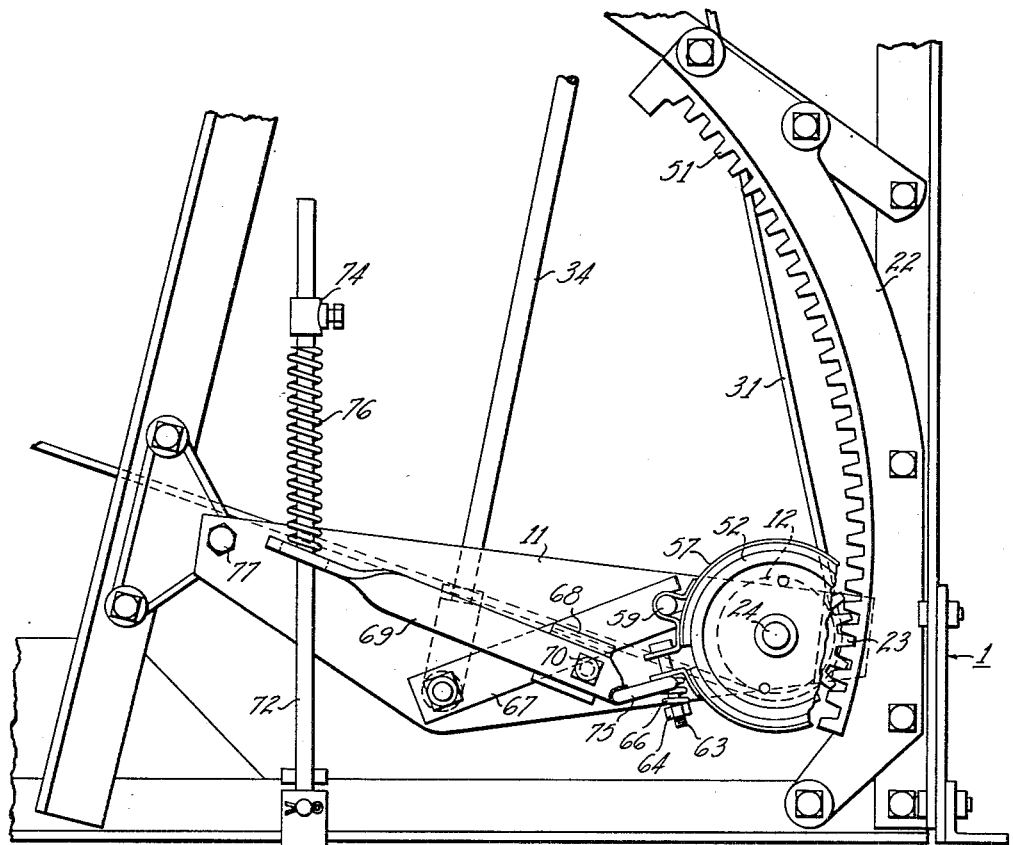
Fig. 2 is an enlarged fragmentary view of a portion of the machine shown in Fig. 1 with the machine in initial bale forming position.

Referring to Figs. 1 and 2, it is seen that a mechanism has been provided for producing soft centered bales. It is to be understood that the density of the bale is determined by the material being baled and by the tension applied to the bale forming belts. Tension is applied to the belts by means of shaft 24 journaled at its ends in arms 11 (only one of which is shown) which shaft has pinions 23 (only one of which is shown) keyed thereto adjacent opposite ends thereof. These pinions are meshed with teeth 51 in frame supported racks 22. It is the resistance that these pinions offer to rotating up the racks which impedes the upward movement of shaft 24 and thereby tensions the belts. Rotatably mounted on shaft 24 is roll 12 about which lower bale forming belts 31 move.

Figure 4:
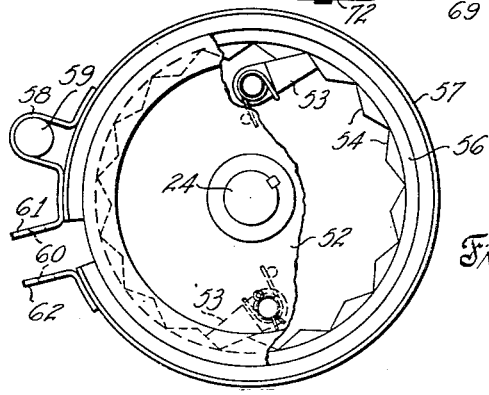
Fig. 4 is an enlarged side view of the brake element, brake band, and pawl housing with part of the pawl housing removed, this being an enlarged portion of Fig. 2.

Attached to shaft 24 adjacent one of the pinions is a pawl housing plate 52 having a pair of spring loaded pawls 53 (see Fig. 4) pivotally mounted on a side thereof in radially spaced relation to shaft 24 and being engageable with inner ratchet like surfaces 54 of brake or torque transmitting element 56 mounted about the pawl housing plate. This pawl housing plate, pawl and brake element forming a one way clutch between shaft 24 and brake element 56, that is shaft 24 can drive brake element 56 in a clockwise direction but in the reverse direction shaft 24 rotates relative to brake element 56 without driving same. A brake band or torque transmitting element 57 as is best shown in Fig. 4, having a loop portion 58 mounted about a pin 59 attached to arm 11 whereby one end 61 of brake band 57 is positioned in substantially fixed relation to arm 11 while the other end 62 can be adjusted relative to the brake element 56. Brake band 57 is mounted in surrounding relation to brake drum or element 56 which is rotatably mounted on shaft 24. The ends of brake band 57 are provided with apertures 60 for receiving an adjusting bolt 63 having a nut 64 on one end thereof. A spring 66 is mounted about bolt 63 between end 62 of brake band 57 and nut 64. By adjusting nut 64 the amount of frictional force acting on brake element 56 by brake band 57 can be varied.

A strap member 67 (see Fig. 2) is rigidly attached to arm 11 by conventional means and includes a bracket 68 pivotally mounting a lever 69 between the ends thereof for pivotal movement in a vertical plane about point 70. One end of lever 69 is provided with an aperture 71 (see Fig. 3) which receives a rod 72 pivotally connected at its lower end to a bracket 73 carried by a lower portion of frame 1. An adjustable stop member 74 is attached to rod 72 adjacent the other end thereof. A compression spring 76 is mounted about rod 72 between the end of lever 69 and stop member 74. The other end 75 of lever 69 is bifurcated and fits around spring 66 with a portion of the upper surface of the bifurcated end in contact with a lower surface of end 62 of brake band 57.

At the start of bale formation which is the position shown in Fig. 2 both springs 66 and 76 are entirely relaxed and brake element 56 is free to rotate relative to band 57 with no impedance thereby and therefore the core of the bale (or first rolled portion) is rolled while there is very little tension on belts 28 and 31 and such core or center portion is relatively soft or of low density. As the bale formation continues (see Fig. 1), the bale increases in size, lower belts 31 tend to pull upwardly on lower tension roll 12. This in turn causes pinions 23 to rotate and move up racks 22 which results in arms 11 pivoting or swinging about their pivot connection 77 with frame 1. With the upward movement of arm 11 the one end of lever 69 tends to compress spring 76 and the force exerted by such spring compression is transmitted to the other end of lever 69 which moves end 62 of brake band 57 toward end 61 thereby tensioning the band about brake element 56 and thereby impeding the rotation of brake element 56 and of pinions 23 placing an increasing tension on belts 31.

Figure 3:
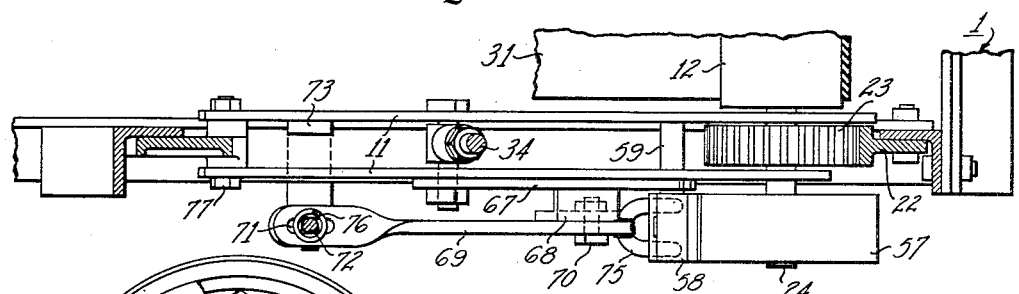
Fig. 3 is a plan view partially in section of a portion of the baler embodying the bale density controller.

It is seen that the embodiment shown in Figs. 1, 2 and 3 that as the bale increases in size and tension arm 11 continues to pivot about pivot center 77, the frictional impedance to rotation of drum 56 is increased thereby producing a bale which has a soft center and the remaining layers of material increasingly becoming more dense as the periphery of the bale is approached. When the bale is discharged arms 11 start their downward movement, pinions 23 drive shaft 24 in the opposite direction and pawl housing plate 52 rotates with shaft 24 relative to brake element 56 until the bale starting position shown in Fig. 2 is again reached. During this downward movement of arms 11, lever 69 returns to the position shown in Fig. 2 with spring 76 again in relaxed position.

Stop member 74 is positionable where desired on rod 72. It is possible to position stop member 74 so that some force is being provided against lever 69 by spring 76 even at the start of the baling operation. Tensioning of band 57 about brake element 56 can also be accomplished so that some frictional impedance exists between the brake band and brake element even at the start of baling operations merely by tightening up nut 64 so as to compress band 57 about brake element 56.

Figure 5:
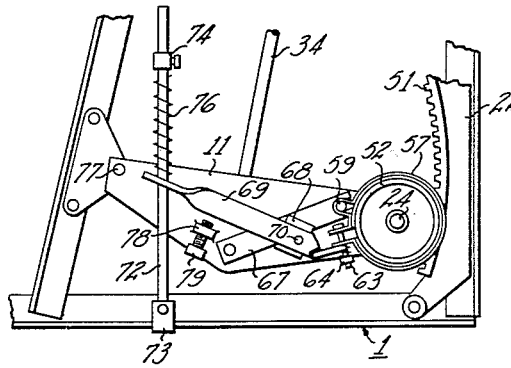
Fig. 5 is a fragmentary view of a portion of a baling machine similar to Fig. 2 showing an alternative embodiment of the invention.

Referring to Fig. 5 an embodiment of a modification of the invention is seen. This modification includes all of the elements previously discussed but in addition, means are provided for limiting the maximum amount of frictional impedance which can be applied to brake element 56 by brake band 57 during the bale forming operation. This means includes a bracket 78 mounted on arm 11 with an adjustable stop bolt 79 threadably engaged with bracket 78. With this stop bolt properly positioned, as arm 11 raises during the bale formation lever 69 progressively applies more and more pressure compressing brake band 57 about brake element 56 until the lower portion of lever 69 is prevented by contacting stop bolt 79 from any further movement relative to arm 11. Then during any further movement of arm 11, the frictional force being applied to brake element 56 will remain constant despite any further compression of spring 76.

Figure 6:
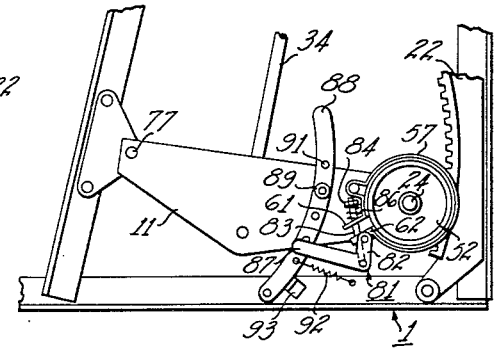
Fig. 6 is a fragmentary view of a portion of a baling machine similar to Fig. 2 showing an alternative embodiment of the invention.

Referring to Fig. 6, an alternative embodiment of the invention is seen. In this embodiment the movable end 62 of brake band 57 has pivotally attached thereto a toggle mechanism 81 including a pair of toggle arms 82 (only one of which is shown) pivotally attached at one end thereof to movable end 62. A bolt 83 received through the apertures 60 in ends 61 and 62 of brake band 57 is provided with a T-shaped end portion pivotally connected to the other ends of toggle arms 82. The other end of bolt 83 is provided with an adjusting nut 84 and a spring 86 is interposed between end 61 of brake band 57 and nut 84. Extending substantially at right angles to the toggle arms and fixedly attached to said other ends thereof is an operating lever 87.

An arcuately shaped actuating element 88 is pivotally attached at one end to frame 1 and includes a roller member 89 which is rotatably mounted on element 88. A series of apertures 91 are provided in element 88 so that the roller member 89 can be selectively positioned in one of them, in place of the position shown in Fig. 6. A spring 92 attached to frame 1 biases arcuate element 88 into contact with a stop member 93 also carried by frame 1.

The operation of this embodiment is as follows: Assuming that the baler is just starting to form a bale as is shown in Fig. 6, nut 84 has been previously adjusted so that the brake band 57 will offer the desired impedance to the rotation of brake element 56 during final bale formation. During initial bale formation brake band 57 is relaxed and offers no impedance to the rotation of brake element 56. Then after initial bale formation, arm 11 has swung upwardly causing pinions 23 to move up racks 22 and operating lever 87 contacts roller 89, by this contact operating lever 87 is moved in a counterclockwise direction and the toggle arm 82 are pivoted about their connection with brake band end 62 until the toggle arms have moved the T-shaped end portion of bolt 83 to an over center position wherein spring 86 has clamped brake band 57 into impeding rotation of brake element 56. At this time the end of operating lever 87 has slipped past roller 89. The impeding pressure on brake element 56 then remains uniform during the balance of bale formation. After the bale has been discharged and arms 11 are returning to bale starting position, the under portion of operating lever 87 contacts roller 89 and causes movement of the toggle mechanism 81 in a clockwise direction thereby snapping open same and relieving the impeding pressure on brake element 56 and positioning the elements in bale starting position as shown in Fig. 6.

With this toggle type mechanism it is seen that the initial portion of a bale is rolled up under little or no tension and at a desired moment of bale formation tension can be automatically applied to the remaining bale rolling operation and which tension is substantially instantaneously applied and which tension remains constant after it has been applied.

Figure 7:
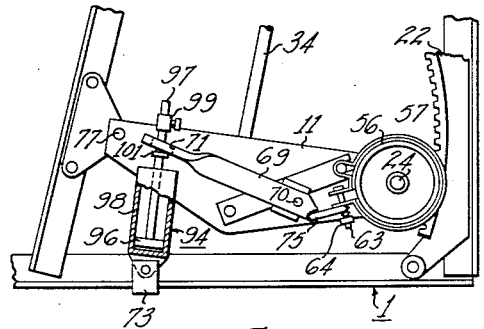
Fig. 7 is a fragmentary view of a portion of a baling machine similar to Fig. 2 showing an alternative embodiment of the invention.
Figure 8:
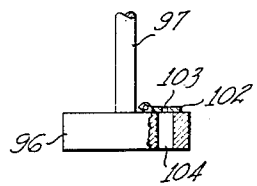
Fig. 8 is an enlarged view of the piston shown in Fig. 7.

Referring to Fig. 7, another embodiment of the invention is shown. This embodiment includes substantially all the same elements as were described in reference to Figs. 1, 2 and 3 except that a resilient hydraulic mechanism 94 has been substituted for the resilient spring 76. Hydraulic mechanism 94 is pivotally connected to bracket 73 carried by frame 1 and includes a hydraulic piston 96 attached to a piston rod 97 which extends out of hydraulic cylinder 98. A stop member 99 is adjustably positioned adjacent one end of piston rod 97 and a stop member 101 is positioned about midportion of piston rod 97. Lever 69 has an aperture 71 in one end thereof which receives the portion of rod 97 between the stop members. The spacing of these stop members provides a lost motion connection between lever 69 and rod 97. Piston 96 is provided with a flutter valve 102 which permits the piston to readily move downward as shown in Fig. 8 but restraining movement of the piston in an upward direction. It is to be understood that piston 96 is operating in a fluid medium such as oil.

The operation of this hydraulic mechanism is as follows: As shown in Fig. 7, the baling machine is just starting a new bale. Adjusting nut 64 has been backed off bolt 63 so that brake band 57 is not impeding rotation of brake element 56. During initial bale forming operation arms 11 pivot about pivot center 77 until the upper portion of lever 69 contacts stop member 99. At this time the initial formation of the bale ends and as arm 11 continues its upward movement piston 96 is pulled upwardly and offers a definite resistance to such pull by the resistance of flow of hydraulic fluid through orifice 103 in flutter valve 102. This resistance to upward movement by the piston causes a pivotal movement of lever 69 about its pivot center 70 which results in a movement of the bifurcated end 75 to move the movable end 62 of brake band 57 into braking engagement with brake element 56. As the resistance to movement presented by piston 96 is constant for its entire range of upward movement the impedance offered to rotation of brake element 56 by brake band 57 is constant.

After the bale has been discharged and arms 11 start their downward return to initial bale forming position, flutter valve 102 pivots about its connection with piston 96 and opens up to present orifice 104 which offers very little impedance to piston 96 returning to its original bale forming position. With this hydraulic mechanism it is, therefore, seen that a bale can be formed with the initial formation being under little or no tension and with the subsequent formation under a constant tension.

Figure 9:
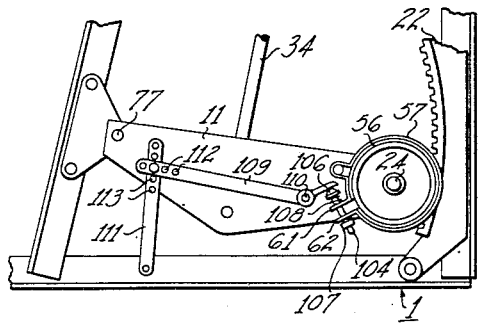
Fig. 9 is a fragmentary view of a portion of a baling machine similar to Fig. 2 showing an alternative embodiment of the invention.

Referring to Fig. 9, another embodiment of the invention is seen. In this embodiment the ends 61 and 62 of brake band 57 are connected by a bolt 104 having an acorn head 106 thereon. An adjusting nut 107 is attached to the other end of bolt 104. Interposed between acorn head 106 and brake band end 61 is a compression spring 108. Nut 107 is adjusted relative to bolt 104 until the desired amount of frictional force between brake elements 56 and brake band 57 suitable for the latter stages of bale formation is achieved. A lever 109 is pivotally mounted about a portion between the ends thereof on arm 11 for movement in a vertical plane at point 110. One end of lever 109 is pivotally adjustably connected with one end of a link 111 pivotally attached to its other end to frame 1. The other end of lever 109 is positioned in contacting overlying relation to the acorn head 106 of bolt 104. In the position shown in Fig. 9 the combination of linkages is such that the other end of lever 109 is pushing down on the acorn head of bolt 104 compressing spring 108 so as to relieve the tension in brake band 57 relative to brake element 56. As is shown in Fig. 9 brake band 57 is exerting substantially no pressure on brake element 56 during initial bale formation. As the bale is formed and arm 11 moves upwardly link 111 pulls on lever 109 causing it to pivot in a counterclockwise direction and thereby gradually release the pressure being exerted on the top of the acorn head of bolt 104. At the end of initial bale formation, the pressure is totally released from the top of the acorn head of bolt 104 and spring 108 is at this time able to utilize its full adjusted energy for compressing brake band 57 about brake element 56 and during the balance of bale formation this impedance to rotation of brake element 56 will remain constant. It is to be noted that lever 109 is provided with a series of adjusting holes 112 and link 111 is also supplied with a series of adjusting holes 113. By adjusting link 111 relative to lever 109 the desired point in bale formation can be achieved when lever 109 is no longer applying any bias effect on the acorn head of bolt 104. If desired, a spring can be interposed between ends 61 and 62 of brake band 57. This spring should be of less strength than spring 108 and would tend to relieve the brake action of brake band 57 when the baling mechanism has returned to initial bale forming position.

The present invention is applicable to balers incorporating density control means differing from the embodiments herein disclosed for purposes of illustration. And accordingly, it should be understood that it is not intended to limit the invention to the exact details of construction and combination herein disclosed by way of example, as various modifications within the scope of the appended claims may occur to persons skilled in the art.

It is claimed and desired to secure by Letters Patent:

1. In a baling machine of the type comprising a frame, a bale rolling belt, a tensioning arm for said belt mounted on said frame for swinging movement between bale starting and bale finishing positions, and brake means automatically operative to impede swinging movement of said arm in the direction from said bale starting toward said bale finishing position and to release said arm for substantially unimpeded swinging movement in the direction from said bale finishing toward said bale starting position, the combination of relatively rotatable, frictionally cooperable torque transmitting elements forming part of said brake means and mounted on said arm for up and down movement therewith, and control means cooperable with one of said torque transmitting elements and with said arm so as to release said arm for substantially unimpeded initial swinging movement from said bale starting toward said bale finishing position, and so so as to substantially impede subsequent swinging movement of said arm toward said bale finishing position.

2. In a baling machine of the type comprising a frame, a bale rolling belt, a tensioning arm for said belt mounted on said frame for swinging movement between bale starting and bale finishing positions, and brake means automatically operative to impede swinging movement of said arm in the direction from said bale starting toward said bale finishing position and to release said arm for substantially unimpeded swinging movement in the direction from said bale finishing toward said bale starting position, the combination of relatively rotatable, frictionally cooperable torque transmitting elements forming part of said brake means and mounted on said arm for up and down movement therewith, and control means cooperable with one of said torque transmitting elements and with said arm so as to release the other of said torque transmitting elements for substantially unimpeded initial swinging movement wtih said arm from said bale starting toward said bale finishing position, and so as to substantially impede subsequent swinging movement of said other torque transmitting element and said arm toward said bale finishing position, said control means including a lost motion connection with a resilient element carried by said machine whereby after said initial movement of said other torque transmitting element and said arm subsequent swinging movement is substantially impeded.

3. In a baling machine of the type comprising a frame, a bale rolling belt, and a tensioning arm for said belt mounted on said frame for swinging movement between bale starting and bale finishing positions, the combination of a torque transmitting element rotatably mounted on said arm and operatively connected with said frame so as to rotate in one direction relative to said arm upon movement of the latter from said bale starting toward said bale finishing position, a brake element mounted on said arm for rotation relative thereto and for swinging movement therewith relative to said frame, a one way driving connection between said torque transmitting element and said brake element for transmitting rotation of said torque transmitting element in said one direction to said brake element, and torque transmitting means operatively interposed between said arm and said brake element for restraining rotation of the latter in said one direction, said torque transmitting means including a friction element cooperable with said brake element for impeding rotation thereof and for impeding swinging movement of said arm in said one direction, and control means carried by said frame and operatively connected with said friction element and with said arm so as to release said brake element for substantially unimpeded rotation in said one direction during initial movement of said arm from said bale starting toward said bale finishing position and so as to impede rotation of said brake element in said one direction during subsequent movement of said arm toward said bale finishing position.

4. In a baling machine of the type comprising a frame, a bale rolling belt, and a tensioning arm for said belt mounted on said frame for swinging movement between bale starting and bale finishing positions, the combination of a torque transmitting element rotatably mounted on said arm and operatively connected with said frame so as to rotate in one direction relative to said arm upon movement of the latter from said bale starting toward said bale finishing position, a brake element mounted on said arm for rotation relative thereto and for swinging movement therewith relative to said frame, a one way driving connection between said torque transmitting element and said brake element for transmitting rotation of said torque transmitting element in said one direction to said brake element, and torque transmitting means operatively interposed between said arm and said brake element for restraining rotation of the latter in said one direction, said torque transmitting means including a friction element cooperable with said brake element for impeding rotation thereof and for impeding swinging movement of said arm in said one direction, and control means carried by said frame and operatively connected with said friction element and with said arm so as to release said brake element for substantially unimpeded rotation in said one direction during initial movement of said arm from said bale starting toward said bale finishing position and so as to impede rotation of said brake element in said one direction during subsequent movement of said arm toward said bale finishing position, said control means including a resilient element carried by said frame and including a lost motion device whereby impeding rotation of said brake element takes place after the inner portion of a bale has been formed.

5. In a baling machine of the type comprising a frame, a bale rolling belt, and a tensioning arm for said belt mounted on said frame for swinging movement between bale starting and a bale finishing positions, the combination of a torque transmitting element rotatably mounted on said arm and operatively connected with said frame so as to rotate in one direction relative to said arm upon movement of the latter from said bale starting toward said bale finishing position and so as to rotate in the opposite direction relative to said arm upon movement of the latter from said bale finishing toward said bale starting position, a brake element mounted on said arm for rotation relative thereto and for swinging movement therewith relative to said frame, a one way driving connection between said torque transmitting element and said brake element for transmitting rotation of said torque transmitting element in said one direction to said brake element and permitting rotation of said torque transmitting element in said opposite direction relative to said brake element, and torque transmitting means operatively interposed between said arm and said brake element for restraining rotation of the latter in said one direction, said torque transmitting means including a friction element cooperable with said brake element for impeding rotation thereof and thereby impeding swinging movement of said arm in said one direction, and control means carried by said frame and including a delayed action mechanism operatively connected with said friction element and with said arm so as to release said brake element for substantially unimpeded rotation in said one direction during initial movement of said arm from said bale starting toward said bale finishing position and so as to impede rotation of said brake element in said one direction during subsequent movement of said arm toward said bale finishing position.

6. In a baling machine of the type comprising a frame, a bale rolling belt, a tensioning arm for said belt mounted on said frame for swinging movement between bale starting and bale finishing positions, and brake means automatically operative to impede swinging movement of said arm in the direction from said bale starting toward said bale finishing position and to release said arm for substantially unimpeded swinging motion in the direction from said bale finishing toward said bale starting position, the combination of frictionally cooperable torque transmitting elements forming part of said brake means, and control means including a lever pivotally mounted at a portion between the ends thereof on said arm, said lever being operatively connected at one end with one of said torque transmitting elements, a delayed acting biasing means carried by said frame and cooperatively connected to the other end of said lever so as to release said arm for substantially unimpeded initial swinging movement from said bale starting toward said bale finishing position, and so as to substantially impede subsequent swinging movement of said arm toward said bale finishing position.

7. In a baling machine of the type comprising a frame, a bale rolling belt, a tensioning arm for said belt mounted on said frame for swinging movement between bale starting and bale finishing positions, and brake means automatically operative to impede swinging movement of said arm in the direction from said bale starting toward said bale finishing position and to release said arm for substantially unimpeded swinging motion in the opposite direction, the combination of frictionally cooperable torque transmitting elements forming part of said brake means, control means including a lever pivotally mounted at a portion between the ends thereof on said arm, said lever being operatively connected at one end with one of said torque transmitting elements, a delayed acting biasing means carried by said frame and cooperatively connected to the other end of said lever so as to release said arm for substantially unimpeded initial swinging movement from said bale starting toward said bale finishing position, and so as to substantially impede subsequent swinging movement of said arm toward said bale finishing position, and a stop member attached to said arm and coacting with said delayed biasing means for limiting the amount of movement of said lever relative to said arm during subsequent movement of said arm to said bale finishing position.

8. In a baling machine of the type comprising a frame, a bale rolling belt, a tensioning arm for said belt mounted on said frame for swinging movement between bale starting and bale finishing positions, and brake means automatically operative to impede swinging movement of said arm in the direction from said bale starting toward said bale finishing position and to release said arm for substantially unimpeded swinging motion in the direction from said bale finishing position toward said bale starting position, the combination of frictionally cooperable torque transmitting elements forming part of said brake means, and control means cooperable with one of said torque transmitting elements and with said arm so as to release said arm for substantially unimpeded initial swinging movement from said bale starting toward said bale finishing position, and so as to substantially impede subsequent swinging movement of said arm toward said bale finishing position, said control means including a lever pivotally mounted at a portion between the ends thereof on said arm, said lever having one end connected to said one torque transmitting element, and a delayed action mechanism carried by said frame and being connected to the other end of said lever, said mechanism comprising a rod pivotally attached at one end to said frame and having an adjustable stop member positioned adjacent the other end thereof, said other end of said lever being provided with a sliding connection with said rod, and a compression spring member mounted about said rod between said stop member and said other end of said lever.

9. In a baling machine of the type comprising a frame, a bale rolling belt, a tensioning arm for said belt mounted on said frame for swinging movement between bale starting and bale finishing positions, and brake means automatically operative to impede swinging movement of said arm in the direction from said bale starting toward said bale finishing position and to release said arm for substantially unimpeded swinging movement in the direction from said bale finishing toward said bale starting position, the combination of frictionally cooperable torque transmitting elements forming part of said brake means, and control means cooperable with one of said torque transmitting elements and with said arm so as to release said arm for substantially unimpeded initial swinging movement from said bale starting toward said bale finishing position, and so as to substantially impede subsequent swinging movement of said arm toward said bale finishing position, said control means including a lever pivotally mounted at a portion between the ends thereof on said arm, said lever having one end thereof connected to said one torque transmitting element, and a delayed action mechanism carried by said frame and being connected to the other end of said lever, said mechanism comprising a piston rod having a lost motion connection with the other end of said rod, a hydraulic cylinder pivotally attached to said frame and coacting with said piston rod and with valves in said cylinder for controlling the rate of flow of fluid through said piston, whereby said piston acts upon said other end of said lever to apply a uniform pressure on said lever and said brake means in response to a swinging movement of said arm in said one direction after said other end has first moved through a distance permitted by said lost motion connection.

10. In a baling machine of the type comprising a frame, a bale rolling belt, a tensioning arm for said belt mounted on said frame for swinging movement between bale starting and bale finishing positions, and brake means automatically operative to impede swinging movement of said arm in the direction from said bale starting toward said bale finishing position and to release said arm for substantially unimpeded swinging movement in the direction from said bale finishing toward said bale starting position, the combination of frictionally cooperable torque transmitting elements forming part of said brake means, and control means cooperable with one of said torque transmitting elements and with said arm so as to release said arm for substantially unimpeded initial swinging movement from said bale starting toward said bale finishing position, and so as to substantially impede subsequent swinging movement of said arm toward said bale finishing position, said control means comprising a lever pivotally mounted between the ends thereof on said arm and having one end connectable with said brake means, and a link member pivotally attached at one end to said frame and pivotally connected at the other end thereof to the other end of said lever, said link and lever being cooperable with brake means for relieving action of one of said torque transmitting elements during initial movement of said arm from said bale starting toward said bale finishing position, and so as to permit said torque transmitting element to impede movement of said arm following said initial movement until said arm has reached bale finishing position.

11. In a baling machine of the type comprising a frame, a bale rolling belt, a tensioning arm for said belt mounted on said frame for swinging movement between bale starting and bale finishing positions, and brake means automatically operative to impede swinging movement of said arm in the direction from said bale starting toward said bale finishing position and to release said arm for substantially unimpeded swinging movement in the direction from said bale finishing toward said bale starting position, the combination of frictionally cooperable torque transmitting elements forming part of said brake means, and control means cooperable with one of said torque transmitting elements and with said arm so as to release said arm for substantially unimpeded initial swinging movement from said bale starting toward said bale finishing position, and so as to substantially impede subsequent swinging movement of said arm toward said bale finishing position, said control means comprising a toggle mechanism attached to said brake means and including an operating element cooperable with a member carried by said frame for moving said toggle into arm movement impeding relation with said brake means after said initial movement of said arm.

12. In a baling machine of the type comprising a frame, a bale rolling belt, a tensioning arm for said belt mounted on said frame for swinging movement between bale starting and bale finishing positions, and brake means automatically operative to impede swinging movement of said arm in the direction from said bale starting toward said bale finishing position and to release said arm for substantially unimpeded swinging movement in the direction from said bale finishing toward said bale starting position, the combination of frictionally cooperable torque transmitting elements forming part of said brake means, and control means cooperable with one of said torque transmitting elements and with said arm so as to release said arm for substantially unimpeded initial swinging movement from said bale starting toward said bale finishing position, and so as to substantially impede subsequent swinging movement of said arm toward said bale finishing position, said control means including a lever pivotally mounted at a portion between the ends thereof on said arm, said lever having one end thereof connected to said one torque transmitting element, and a delayed action mechanism carried by said frame and being connected to the other end of said lever, said mechanism comprising a rod pivotally attached at one end to said frame and having a selectively movable stop member positioned adjacent the other end thereof, said other end of said lever being provided with a sliding connection with said rod, and a compression spring slidably mounted about said rod between said stop member and said other end of said lever, said compression spring being substantially uncompressed during said initial movement of said arm and during subsequent movement of said arm to bale finishing position said spring becoming uniformally increasingly compressed.

13. In a baling machine of the type comprising a frame, a bale rolling belt, and a tensioning arm for said belt mounted on said frame for swinging movement between bale starting and bale finishing positions, the combination of a torque transmitting element rotatably mounted on said arm and operatively connected with said frame so as to rotate in one direction relative to said arm upon movement of the latter from said bale starting toward said bale finishing position, a brake element mounted on said arm for rotation relative thereto and for swinging movement therewith relative to said frame, a one way driving connection between said torque transmitting element and said brake element for transmitting rotation of said torque transmitting element in said one direction to said brake element, and torque transmitting means operatively interposed between said arm and said brake element for restraining rotation of the latter in said one direction, said torque transmitting means including a friction element cooperable with said brake element and being connected to said arm, a toggle member attached to said friction element, an operating lever carried by said toggle member, and an actuating member connected to said frame and cooperable with said operating lever after initial movement of said arm from said bale starting position toward said bale finishing position to snap said toggle member and thereby engage said friction element with said brake element with a substantially uniform rotation impeding force during the remaining movement of said arm to said bale finishing position.

14. In a baling machine of the type comprising a frame, a bale rolling belt, and a tensioning arm for said belt mounted on said frame for swinging movement between bale starting and bale finishing positions, the combination of a torque transmitting element rotatably mounted on said arm and operatively connected with said frame so as to rotate in one direction relative to said arm upon movement of the latter from said bale starting toward said bale finishing position, a brake element mounted on said arm for rotation relative thereto and for swinging movement therewith relative to said frame, a one way driving connection between said torque transmitting element and said brake element for transmitting rotation of said torque transmitting element in said one direction to said brake element, and torque transmitting means operatively interposed between said arm and said brake element for restraining rotation of the latter in said one direction said torque transmitting means including a friction element cooperable with said brake element and being connected to said arm, a toggle member attached to said friction element, an operating lever carried by said toggle member, and an actuating member connected to said frame and cooperable with said operating lever after initial movement of said arm from said bale starting position toward said bale finishing position to snap said toggle member and thereby engage said friction element with said brake element with a substantially uniform force during the remaining movement of said arm to said bale finishing position, said actuating member comprising an arcuate element pivotally attached to said frame, a roller member selectively positionable on said arcuate element to contact said operating lever after said initial movement of said arm, a spring element attached between said frame and said arcuate element restraining pivotal movement of the latter in one direction, and a stop member carried by said frame for limiting movement of said arcuate element in the opposite to said one direction, whereby when said arm moves from bale finishing position to bale starting position said operating lever contacts said roller member unlatching said toggle member releasing said friction element from said brake element.

15. In a baling machine of the type comprising a frame, a bale rolling belt, and a tensioning arm for said belt mounted on said frame for swinging movement between bale starting and bale finishing positions, the combination of a torque transmitting element rotatably mounted on said arm and operatively connected with said frame so as to rotate in one direction relative to said arm upon movement of the latter from said bale starting toward said bale finishing position and so as to rotate in the opposite direction relative to said arm upon movement of the latter from said bale finishing toward said bale starting position, a brake element mounted on said arm for rotation relative thereto and for swinging movement therewith relative to said frame, a one way driving connection between said torque transmitting element and said brake element for transmitting rotation of said torque transmitting element in said one direction to said brake element and permitting rotation of said torque transmitting element in said opposite direction relative to said brake element, and torque transmitting means operatively interposed between said arm and said brake element for restraining rotation of the latter in said one direction, said torque transmitting means including a friction element cooperable with said brake element, and control means comprising a lever pivotally mounted between the ends thereof on said arm and having one end cooperable with said friction element for moving same into impeding relation to said brake element and for moving same in unimpeding relation to said brake element, and means carried by said frame and connected to the other end of said lever and coacting therewith for moving said friction element as a result of movement of said arm, said last mentioned means being so combined with said friction element that at the start of said baling operation said brake element is free to rotate relative to said friction means and as the baling operation continues a uniformly increasing force is applied to said brake element by said friction element thereby impeding rotation of same.

References Cited in the file of this patent
UNITED STATES PATENTS

| | | |
|---|---|---|
| 972,884 | Luebben | Oct. 18, 1910 |
| 2,424,821 | Harrer | July 29, 1947 |
| 2,468,641 | Scranton et al. | Apr. 26, 1949 |